United States Patent
Jiang et al.

(10) Patent No.: US 12,172,670 B2
(45) Date of Patent: Dec. 24, 2024

(54) PERFORMANCE OF NEURAL NETWORKS UNDER DISTRIBUTION SHIFT

(71) Applicants: Robert Bosch GmbH, Stuttgart (DE); Carnegie Mellon University, Pittsburgh, PA (US)

(72) Inventors: Yiding Jiang, Pittsburgh, PA (US); Christina Baek, Pittsburgh, PA (US); Jeremy Kolter, Pittsburgh, PA (US); Aditi Raghunathan, Pittsburgh, PA (US); João D. Semedo, Pittsburgh, PA (US); Filipe J. Cabrita Condessa, Pittsburgh, PA (US); Wan-Yi Lin, Wexford, PA (US)

(73) Assignee: Robert Bosch GmbH (DE)

( * ) Notice: Subject to any disclaimer, the term of this patent is extended or adjusted under 35 U.S.C. 154(b) by 373 days.

(21) Appl. No.: 17/841,120

(22) Filed: Jun. 15, 2022

(65) Prior Publication Data
US 2023/0406344 A1    Dec. 21, 2023

(51) Int. Cl.
*B60W 60/00*  (2020.01)
*G06V 10/82*  (2022.01)
*G06V 20/56*  (2022.01)

(52) U.S. Cl.
CPC .......... *B60W 60/001* (2020.02); *G06V 10/82* (2022.01); *G06V 20/56* (2022.01); *B60W 2420/403* (2013.01)

(58) Field of Classification Search
CPC .......... B60W 60/001; B60W 2420/403; G06V 10/82; G06V 20/56
See application file for complete search history.

(56) References Cited

U.S. PATENT DOCUMENTS

| | | | |
|---|---|---|---|
| 2022/0156524 A1* | 5/2022 | Alon | G06N 3/045 |
| 2022/0164602 A1* | 5/2022 | Frtunikj | G06F 18/2115 |

OTHER PUBLICATIONS

Jiang et al., "Assessing Generalization Via Disagreement", Published as a conference paper at ICLR 2022, 28 pages.
(Continued)

*Primary Examiner* — Quang N Vo
(74) *Attorney, Agent, or Firm* — Dickinson Wright PLLC

(57) ABSTRACT

Methods and systems of estimating an accuracy of a neural network on out-of-distribution data. In-distribution accuracies of a plurality of machine learning models trained with in-distribution data are determined. The plurality of machine learning models includes a first model, and a remainder of models. In-distribution agreement is determined between (i) an output of the first machine learning model executed with an in-distribution dataset and (ii) outputs of a remainder of the plurality of machine learning models executed with the in-distribution dataset. The machine learning models are also executed with an unlabeled out-of-distribution dataset, and an out-of-distribution agreement is determined. The in-distribution agreement is compared with the out-of-distribution agreement. Based on a result of the comparison being within a threshold, an accuracy of the first machine learning model on the unlabeled out-of-distribution dataset is estimated based on (i) the in-distribution accuracies, (ii) the in-distribution agreement, and (iii) the out-of-distribution agreement.

20 Claims, 10 Drawing Sheets

(56) References Cited

OTHER PUBLICATIONS

Miller et al., "Accuracy on the Line: On the Strong Correlation Between Out-of-Distribution and In-Distribution Generalization", Proceedings of the 38 th International Conference on Machine Learning, PMLR 139, 2021, 15 pages.

Garg et al., "Leveraging Unlabeled Data To Predict Out-Of-Distribution Performance", Published as a conference paper at ICLR 2022, 28 pages.

* cited by examiner

PERFORMANCE OF NEURAL NETWORKS UNDER DISTRIBUTION SHIFT

TECHNICAL FIELD

The present disclosure relates to improving the performance of neural networks under a distribution shift. In embodiments, this disclosure relates to improving neural networks by estimating their accuracy when executed with out-of-distribution data.

BACKGROUND

Machine learning systems can exhibit impressive performance when these models observe and make decisions on inputs obtained from the same distribution as the data they were trained with. Once trained, a machine learning model can process in-distribution data and out-of-distribution data. In-distribution data refers to data that is similar to the training data used to train the model. Out-of-distribution data is data that differs from the model's training data. For example, in the context of machine learning models used to process images of street signs, a particular model may be trained with in-distribution data corresponding to street signs from a particular region or country. When that model is then used to process images of street signs from a different region or country that might appear different, this may subjecting the machine learning models to out-of-distribution data. For machine learning systems to be reliable, one should understand their performance in unseen, out-of-distribution environment.

SUMMARY

In an embodiment, a computer-implemented method of estimating an accuracy of a neural network on out-of-distribution data is provided. In-distribution accuracies of a plurality of machine learning models trained with in-distribution data are determined. The plurality of machine learning models includes a first model, and a remainder of models. In-distribution agreement is determined between (i) an output of the first machine learning model executed with an in-distribution dataset and (ii) outputs of a remainder of the plurality of machine learning models executed with the in-distribution dataset. The machine learning models are also executed with an unlabeled out-of-distribution dataset, and an out-of-distribution agreement is determined between the output of the first model on the out-of-distribution dataset, and the output of the remainder of models on the out-of-distribution dataset. The in-distribution agreement is compared with the out-of-distribution agreement. Based on a result of the comparison being within a threshold, an accuracy of the first machine learning model on the unlabeled out-of-distribution dataset is estimated based on (i) the in-distribution accuracies, (ii) the in-distribution agreement, and (iii) the out-of-distribution agreement In another embodiment, a system of estimating an accuracy of a neural network subject to a distribution shift is provided. The system includes an actuator configured to actuate based on commands from a computerized control system. The system includes one or more processors, and memory including instructions that, when executed by the one or more processors, cause the one or more processors to perform the following steps: utilize a plurality of machine learning models trained with in-distribution data, wherein the plurality of machine learning models includes a first machine learning model and a remaining number of machine learning models; determine in-distribution accuracies of the plurality of machine learning models by executing the plurality of machine learning models with in-distribution data; determine an in-distribution agreement between (i) an output of the first machine learning model executed with the in-distribution data and (ii) outputs of remaining number of machine learning models executed with the in-distribution data; execute the plurality of machine learning models with unlabeled out-of-distribution data; determine an out-of-distribution agreement between (i) an output of the first machine learning model executed with the unlabeled out-of-distribution data and (ii) outputs of the remaining number of machine learning models executed with the unlabeled out-of-distribution data; compare the in-distribution agreement with the out-of-distribution agreement; based on the comparison indicating a sufficient similarity between the in-distribution agreement and the out-of-distribution agreement, estimate an out-of-distribution accuracy of the first machine learning models with the unlabeled out-of-distribution dataset based on (i) the in-distribution accuracies, (ii) the in-distribution agreement, and (iii) the out-of-distribution agreement; and based on the estimated accuracy exceeding an accuracy threshold, command the computerized control system to actuate the actuator.

In yet another embodiment, a system of estimating an accuracy of a neural network subject to a distribution shift includes one or more processors programmed to perform the following: determine in-distribution accuracies of a plurality of machine learning models by executing on in-distribution data, wherein the plurality of machine learning models includes a first machine learning model and a remainder of machine learning models; determine an in-distribution agreement between (i) an output of the first machine learning model executed with the in-distribution data and (ii) outputs of the remainder of machine learning models executed with the in-distribution data; execute the plurality of machine learning models with unlabeled out-of-distribution data; determine an out-of-distribution agreement between (i) an output of the first machine learning model executed with the unlabeled out-of-distribution data and (ii) outputs of the remainder of machine learning models executed with the unlabeled out-of-distribution data; compare the in-distribution agreement with the out-of-distribution agreement; and estimate an out-of-distribution accuracy of the first machine learning model with the unlabeled out-of-distribution dataset based on (i) the in-distribution accuracies, (ii) the in-distribution agreement, and (iii) the out-of-distribution agreement.

DETAILED DESCRIPTION

Figure 1:
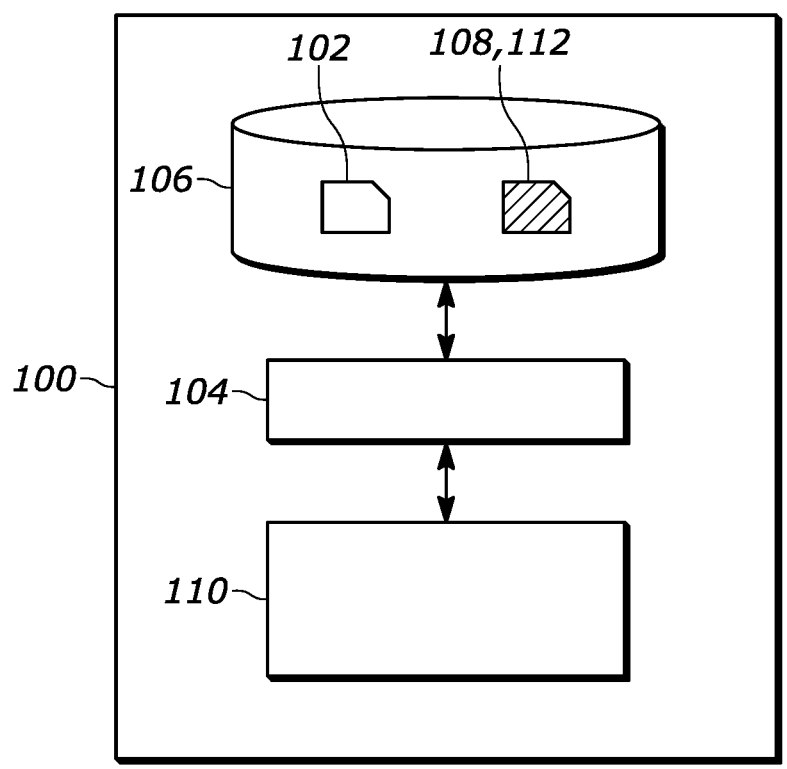
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Machine learning systems can exhibit impressive performance when these models observe and make decisions on inputs obtained from the same distribution as the data they were trained with. Once trained, a machine learning model can process in-distribution data and out-of-distribution data. In-distribution (ID) data refers to data that is similar to the training data used to train the model. Out-of-distribution (OOD) data refers to data that differs from the model's training data. For example, in the context of machine learning models used to process images of street signs, a particular model may be trained with ID data corresponding to street signs from a particular region or country. When that model is then used to process images of street signs from a different region or country that might have a different appearance, style, or meaning, this may be subjecting the machine learning models to OOD data. For machine learning systems to be reliable, one should understand their performance in unseen, out-of-distribution environment.

ID data can refer to data (e.g., images or image data in an example of an image-recognition machine learning model) that is drawn from the same collection as that used to train the machine learning model, including hold-out validation data. When collecting data and training a machine learning model, the data that is acquired would be, by default, a prime example of ID data. From there, multiple splits of training, evaluations, and/or validation can be performed using the ID data. As will be explained more below, In order to assess ID accuracy—and ID agreement—a hold-out validation set is used because the nature of deep learning models is that they precisely fit training data. OOD data can refer to data generated under (even slightly) different conditions than when collecting the data for training and validation. This means that real-world deployment of a machine learning system acts very commonly on OOD data. And as will be explained more below, this means that using ID estimation exclusively as a measurement of performance of the model is a flaw, one which this disclosure sets out to mitigate.

Machine learning models often need to generalize from training data to new environments. For example, a kitchen robot should work reliably in different homes, autonomous vehicles should drive reliably in different cities or regions or under various environmental conditions, and clinical models trained on data from one hospital should perform well when executed on data from other hospitals. The standard paradigm to measure generalization is to evaluate a model on a single test set drawn from the same distribution as the training set—ID data. Traditionally, the performance of a machine learning method on a given task is estimated by measuring the agreement between the machine learning predictions and the labels (ground truth) on a dataset representative of the task at hand and the environment on which the machine learning method will be applied. But this paradigm only analyzes the in-distribution performance of the model. The task of assessing the out-of-distribution performance is difficult because in the real-world labeled out-of-distribution data is rare. In many scenarios, it is hard or impossible to train a model on precisely the distribution that it will be applied to. Hence, a model will inevitably encounter OOD data on which its performance could vary widely compared to its ID performance.

This disclosure describes if and how OOD performance of a model can be estimated by its own ID performance. According to various embodiments disclosed herein, systems and methods are provided for estimating a machine learning model's accuracy on OOD data. The machine learning model's accuracy can be estimated based on unlabeled OOD data, which is much more prevalent and accessible than labeled OOD data.

The disclosed systems and methods rely on machine learning models, such as neural networks (e.g., deep neural networks (DNN), graphical neural networks (GNN), deep convolutional networks (DCN), convolutional neural networks (CNN), etc.) and the like. FIG. 1 shows a system 100 for training a neural network, e.g., a deep neural network. The neural network or deep neural networks shown and described are merely examples of the types of machine learning networks or neural networks that can be used. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input the output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the neural networks described herein. Additional structure for operating and training the machine learning models is shown in FIG. 2.

Figure 2:
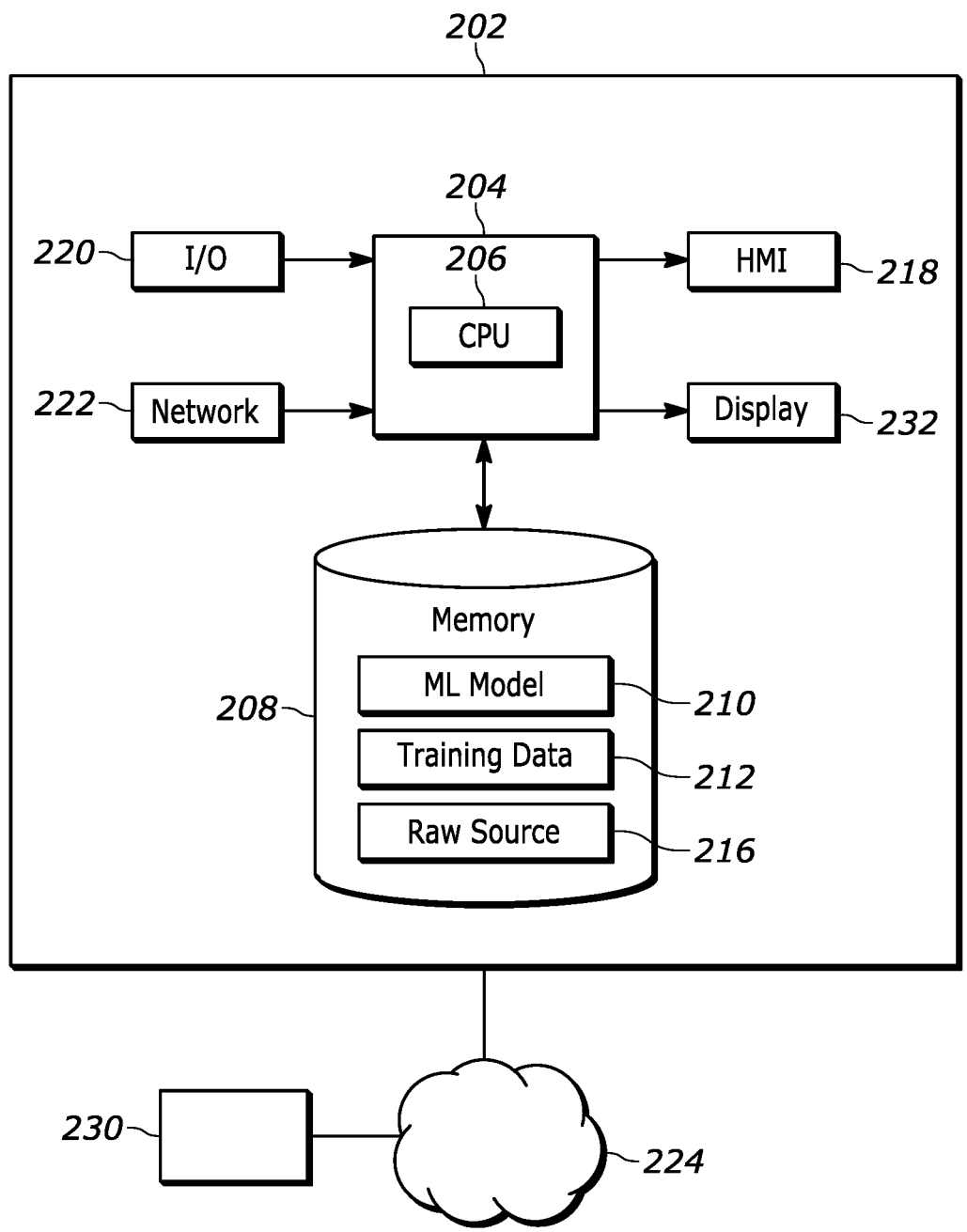
FIG. 2 shows a computer-implemented method for training and utilizing a neural network, according to an embodiment.

FIG. 2 depicts a system 200 to implement the machine learning models described herein, for example the deep neural networks described herein. Other types of machine learning models can be used, and the DNNs described herein are not the only types of machine learning models capable of being used in the system of this disclosure. For example, if the input image contains an ordered sequence of pixels, a CNN may be utilized. The system 200 can be implemented to perform one or more of the phases of image recognition described herein. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine learning model 210 or algorithm, a training dataset 212 for the machine learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuity or BUS networks to transfer information to or between the processor(s) and storage. For example, the I/O interface 220 can include digital I/O logic lines which can be read or set by the processor(s), handshake lines to supervise data transfer via the I/O lines; timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface). The I/O interface 220 can be referred to as an input interface (in that it transfers data from an external input, such as a sensor), or an output interface (in that it transfers data to an external output, such as a display).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine learning algorithm 210 that is configured to analyze the raw source dataset 216. The raw source dataset 216 may include raw or unprocessed sensor data that may be representative of an input dataset for a machine learning system. The raw source dataset 216 may be in-distribution information or out-of-distribution data, as described herein. The raw source dataset 216 may include video, video segments, images, text-based information, audio or human speech, time series data (e.g., a pressure sensor signal over time), raw or partially processed sensor data (e.g., radar map of objects). Moreover, the raw source dataset 216 may be input data derived from an associated sensor such as a camera, lidar, radar, ultrasonic sensor, motion sensor, thermal imaging camera, or any other type of sensor that produces associated data with spatial dimensions where there is some notion of a "foreground" and a "background" within those spatial dimensions. References to an input or input "image" herein is not necessarily from a camera, but can be from any of the above-listed sensors. Several different examples of inputs are shown and described with reference to FIGS. 5-11. In some examples, the machine learning algorithm 210 may be a neural network algorithm (e.g., deep neural network) that is designed to perform a predetermined function. For example, the neural network algorithm may be configured to identify defects (e.g., cracks, stresses, bumps, etc.) in a part subsequent to the manufacture of that part but prior to leaving the plant. In another embodiment, the neural network algorithm may be configured in automotive applications to identify obstacles or pedestrians in images, as well as their respective poses, direction of travel, and the like.

The computer system 200 may store a training dataset 212 for the machine learning algorithm 210. The training dataset 212 may represent a set of previously constructed data for training the machine learning algorithm 210 (e.g., in-distribution data). The training dataset 212 may be used by the machine learning algorithm 210 to learn weighting factors associated with a neural network algorithm. The training dataset 212 may include a set of source data that has corresponding outcomes or results that the machine learning algorithm 210 tries to duplicate via the learning process. In one example, the training dataset 212 may include input images that include an object (e.g., a pedestrian). The input images may include various scenarios in which the objects are identified. Once trained, the machine learning algorithm 210 can process other in-distribution data that was not used during the training process. And, as will be described below, the trained machine learning algorithm 210 can process out-of-distribution data that was not used during the training process.

The machine learning algorithm 210 may be operated in a learning mode using the training dataset 212 as input. The machine learning algorithm 210 may be executed over a number of iterations using the data from the training dataset 212. With each iteration, the machine learning algorithm 210 may update internal weighting factors based on the achieved results. For example, the machine learning algorithm 210 can compare output results (e.g., a reconstructed or supplemented image, in the case where image data is the input) with those included in the training dataset 212. Since the training dataset 212 includes the expected results, the machine learning algorithm 210 can determine when performance is acceptable. After the machine learning algorithm 210 achieves a predetermined performance level (e.g., 100% agreement with the outcomes associated with the training dataset 212), or convergence, the machine learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine learning algorithm 210 may be applied to new datasets to generate annotated data.

The machine learning algorithm 210 may be configured to identify a particular feature in the raw source data 216. The raw source data 216 may include a plurality of instances or input dataset for which supplementation results are desired. For example, the machine learning algorithm 210 may be configured to identify the presence of a pedestrian in video images and annotate the occurrences. In another example, the machine learning algorithm 210 may be configured to identify the presence of a defect in a manufactured part by capturing images of that part. In another example, the machine learning algorithms 210 may be configured to identify and interpret road signs so that an autonomous or semi-autonomous vehicle can operate accordingly (e.g., change speed in response to detecting a new speed limit sign). The machine learning algorithm 210 may be programmed to process the raw source data 216 to identify the presence of the particular features. The machine learning algorithm 210 may be configured to identify a feature in the raw source data 216 as a predetermined feature (e.g., obstacle, pedestrian, road sign, etc.). The raw source data 216 may be derived from a variety of sources. For example, the raw source data 216 may be actual input data collected by a machine learning system. The raw source data 216 may be machine generated for testing the system. As an example, the raw source data 216 may include raw video images from a camera.

Figure 3:
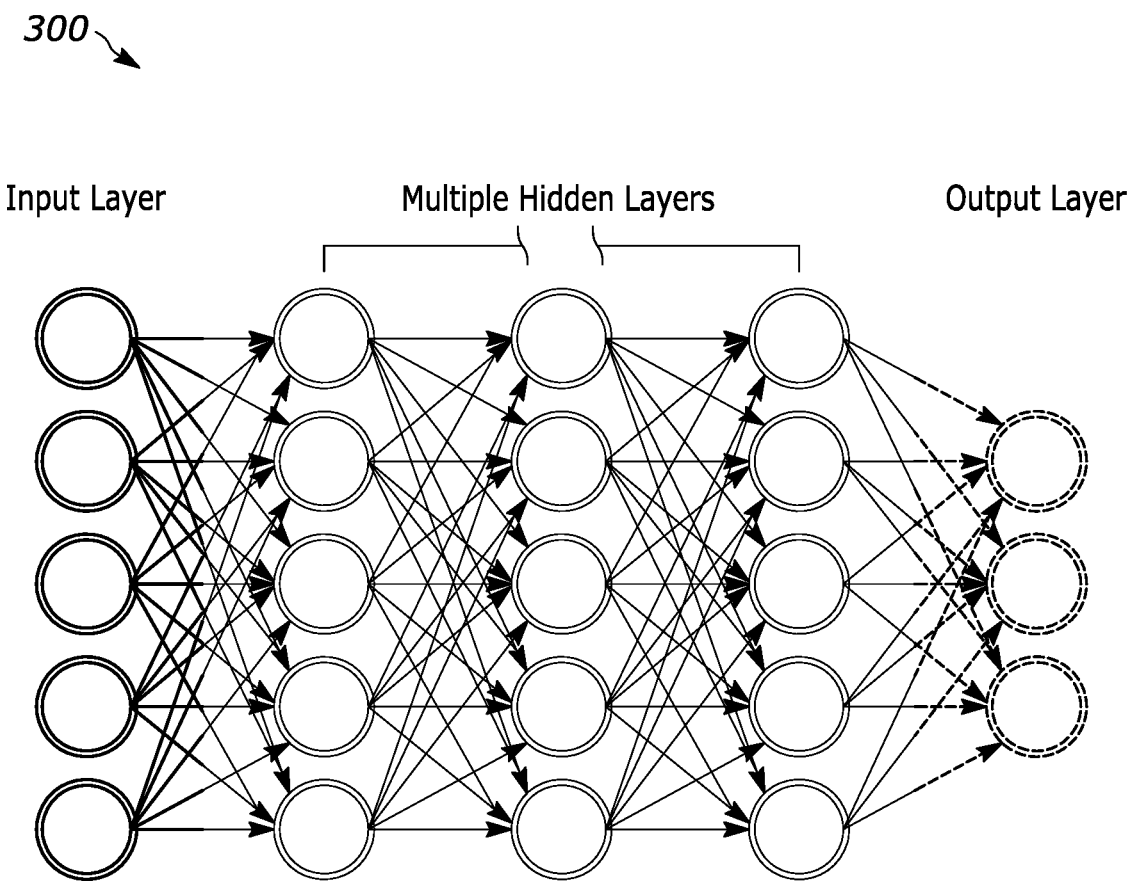
FIG. 3 shows a schematic of a deep neural network with nodes in an input layer, multiple hidden layers, and an output layer, according to an embodiment.

For illustrative purposes, FIG. 3 illustrates an example schematic of a machine learning model 300, such as those described herein. As discussed above, the machine learning model 300 may be a neural network (e.g., and in some cases, while not required, a deep neural network). The machine learning model 300 can include an input layer (having a plurality of input nodes) and an output layer (having a plurality of output nodes). The input layers may include the input data (e.g., an image captured from an image sensor, or associated image data). The output layers may include a desired output (e.g., the determined content of the image, as determined by the machine learning model 300). In some examples, machine learning model 300 may include a plurality of hidden layers. The nodes of the input layer, output layer, and hidden layers may be coupled to nodes of subsequent or previous layers. And each of the nodes of the output layer may execute an activation function—e.g., a function that contributes to whether the respective nodes should be activated to provide an output of the machine learning model 300. The quantities of nodes shown in the input, hidden, and output layers are merely exemplary and any suitable quantities may be used.

As explained above, the evaluation of performance of a machine learning model on OOD data is usually done by excluding a fraction of the available data from the training procedure and evaluating the performance of the rained models on the held-out data. This has two related shortcomings. First, labeled data can be expensive and time-consuming to obtain, and excluding it from the training process leads to reduced model performance. And second, the requirement that the system needs labeled data for generalization evaluation also means that it is often impossible to query generalization on OOD data, which is of general interest in practical applications. Since the methods described herein rely on disagreement between models, no OOD data is required to be labeled.

Systems and methods are disclosed below for identifying whether a machine learning model's OOD accuracy can be estimated, as well as estimating a machine learning model's OOD accuracy without requirement labeled OOD data, which can be expensive and can also lead to a reduced accuracy in the model itself as explained above. The inventors of this disclosure have observed an analogous phenomenon based upon model agreement rather than model accuracy. Specifically, if pairs of neural network of classifiers are considered, there often exists a linear correlation between ID vs OOD agreement. This phenomenon can be referred to as "agreement-on-the-line". Exploiting this phenomenon, this disclosure develops methods and systems for estimating the OOD performance of classifiers without any access to labeled OOD data (and by observing whether agreement-on-the-line holds, the method also provides a "sanity check" that these estimates are reasonable).

This agreement-on-the-line phenomenon will now be described. Let H define a set of neural networks trained on datasets $(X_{train}, Y_{train})=\{(x_i, y_i)\}_{i=1}^{m_{train}}$ that are sampled from $D_{ID}$ (in-distribution). Given any pair of models h, h' ∈ H, for a distribution D (not necessarily matching $D_{ID}$) the expected accuracy (Acc) is defined as $ACC_D(h)=\mathbb{E}_{x,y\sim D}[I(h(x), y)]$ where $I(a,b)=1$ if $a=b$ and $I(a,b)=0$ if $a\neq b$, and the agreement (Agg) is defined as $Agg_D(h, h')=\mathbb{E}_{x\sim D}[I(h(x), h(x'))]$.

Assuming access to a labeled validation set $(X_{val}, y_{val})=\{(x_i, y_i)\}_{i=1}^{m_{val}}$ that are sampled from $D_{ID}$ (in-distribution), the ID accuracy can be estimated as $$\widehat{Acc_{in}}(h) = \frac{1}{m_{val}} \sum_{x,y \in (X_{val}, y_{val})} I(h(x), y) \quad (1)$$

where $m_{val}$ denotes the size of the validation set $(X_{val}, y_{val})$.

Without access to labels from OOD data (which is often impractical to obtain), the estimation of the OOD accuracy cannot be directly computed. Conversely, the estimation of the agreement between the pair of models requires only access to unlabeled data. The ID and OOD agreement between the pair of models h, h' ∈ H can be estimated as $$\widehat{Agg_{in}}(h, h') = \frac{1}{m_{val}} \sum_{x \in X_{OOD}} I(h(x), h'(x)), \text{ and} \quad (2)$$

$$\widehat{Agg_{ood}}(h, h') = \frac{1}{m_{ODD}} \sum_{x \in X_{OOD}} I(h(x), h'(x))$$

respectively. This assumes access to unlabeled OOD samples $X_{OOD}=\{x_i\}_{i=1}^{m_{OOD}}$ from shifted distribution $D_{OOD}$.

The models described herein are not intended to be limited and can be one of a plurality of types of machine learning models, such as Random Forest, k-Nearest Neighbor (KNN), Random Features, support vector machine (SVM), AdaBoost, or the like.

When comparing various pairs of machine learning models according to the above, the agreement-on-the-line is observed, in which (1) when ID vs. OOD accuracy observes a strong linear correlation (≥0.95 $R^2$ values, where $R^2$ is a coefficient of determination value), the ID vs. OOD agreement is also strongly linearly correlated, (2) when both accuracy and agreement observe strong linear correlation, these linear correlations have almost the same slope and bias, and (3) when linear correlation of ID vs. OOD accuracy is weak (≤0.75 $R^2$ values), the linear correlation between ID and OOD agreement is similarly weak.

This allows agreement to be estimated with just unlabeled data. Hence the agreement-on-the-line phenomenon has important practical implications for both checking whether the distribution shift observes accuracy-on-the-line and predicting the actual value of OOD accuracy without any OOD labels. Also, agreement-on-the-line does not directly follow from accuracy-on-the-line. While prior work has observed that expected ID accuracy often equates to ID agreement over pairs of models with the same architecture, trained on the same dataset but without different random seeds, agreement-on-the-line goes beyond these results in two ways: agreement between models with different architectures and agreement between different checkpoints on the same training run is also on the ID vs OOD agreement line. These ID/OOD agreements do not equal the expected ID/OOD accuracy.

With this background on the observed agreement-on-the-line phenomenon, now methods and system to perform model selection and estimation of accuracy under distribution shifts will be described. Distribution shift refers to the providing of OOD data to a trained machine learning model, or shifting from ID to OOD data.

Based on the agreement-on-the-line discussion above, when ID vs. OOD agreement lies on a line for all h, h' ∈ H, the ID vs OOD accuracy for all h ∈ H would approximately also lie on the same line after Probit scaling $\Phi$ (inverse of the cumulative density function of the standard Gaussian distribution). Defining a line as y=a*x+b, the correlation is as follows:

$$\Phi^{-1}(Acc_{OOD}(h)) = a \cdot \Phi^{-1}(Acc_{ID}(h)) + b \Leftrightarrow \Phi^{-1}(Agg_{OOD}(h,h')) = a \cdot \Phi^{-1}(Agg_{ID}(h,h')) + b \quad (3)$$

The slope (a) and bias (b) of the linear fit can be estimated by linear regression on the in- and out-of-distribution agreement as follows:

$$\hat{a},\hat{b} = \underset{a,b \in \mathbb{R}}{\mathrm{argmin}} \sum_{i \neq j} \left( \Phi^{-1}(\widehat{Agr_{OOD}}(h_i, h_j)) - a^* \Phi^{-1}(\widehat{Agr_{ID}}(h_i, h_j)) - b \right)^2 \quad (4)$$

The slope (a) and bias (b) from equation (4) can be inputted into equation (3) to estimated the OOD accuracy $Acc_{OOD}(h)$.

According to a first embodiment of estimating the OOD accuracy of a model, the inputs include n-distribution validation set $X_{ID} = (X_{val}, y_{val}) = \{(x_i, y_i)\}_{i=1}^{m_{val}}$, unlabeled out of distribution validation set $X_{OOD} = \{x_i\}_{i=1}^{m_{OOD}}$, a set H containing n number of models. First, the in-distribution accuracy of each model $\widehat{Acc_{ID}}(h)$ is determined as defined in equation (1) for all models $h_i$ in H. Second, the in-distribution agreement $\widehat{Agg_{ID}}(h_i, h_j)$ and out-of-distribution agreement $Agg_{OOD}(h_i, h_j)$ between all pairs of models $h_i$, $h_j$ are determined. Third, using equation (4) above, the slope $\hat{a}$ and bias $\hat{b}$ are determined. And fourth, the estimated OOD accuracy is determined as $\hat{a} \cdot \Phi^{-1}(Acc_{ID}(h)) + \hat{b}$ for model h in H.

Note that in this embodiment, the OOD disagreement estimates are not directly used concerning the model of interest h—instead, only the disagreements are used indirectly via the estimated slope and bias. Therefore, a more appropriate estimator can be obtained by directly using the model's OOD agreement estimates via algebra as follows. For any pair of models h, h' in H, $$\frac{1}{2}\Phi^{-1}(\widehat{Acc_{OOD}}(h)) + \frac{1}{2}\Phi^{-1}(\widehat{Acc_{OOD}}(h')) = \quad (5)$$
$$\Phi^{-1}(\widehat{Agg_{OOD}}(h, h')) + a * \left( \frac{\Phi^{-1}(\widehat{Acc_{ID}}(h)) + \Phi^{-1}(\widehat{Acc_{ID}}(h'))}{2} - \widehat{Agg_{ID}}(h, h') \right)$$

The estimates of slope and bias from equations (4) can be inputted into equation (5) and the rest of the inputs can be taken from sample averages. In this way, a system of linear equations is constructed of the form of equation (5) involving "unknown" estimates of the OOD accuracy of models (left of the equals sign), and other "known" quantities (right of the equals sign). The linear equations can be solved together.

Thus, according to a second embodiment of estimating the OOD accuracy of a model, the inputs include in-distribution validation set $X_{ID} = (X_{val}, y_{val}) = \{(x_i, y_i)\}_{i=1}^{m_{val}}$, unlabeled out of distribution validation set $X_{OOD} = \{x_i\}_{i=1}^{m_{OOD}}$, a set H containing n number of models. First, the in-distribution accuracy of each model $\widehat{Acc_{ID}}(h)$ is determined as defined in equation (1) for all models $h_i$ in H. Second, the in-distribution agreement $\widehat{Agg_{ID}}(h_i, h_j)$ and out-of-distribution agreement $Agg_{OOD}(h_i, h_j)$ between all pairs of models $h_i$, $h_j$ are determined. Third, using equation (4) above, the slope $\hat{a}$ and bias $\hat{b}$ are determined. Fourth, vectors $$A = R^{\frac{n(n-1)}{2} \times n}, \quad b = R^{\frac{n(n-1)}{2}}$$

are initialized. Fifth, for i=1, 2, 3, 4, ..., n: for j,k ∈ ⌊n⌋, j,k≠i, let $\Lambda_{ij} = \frac{1}{2}$, $\Lambda_{ik} = \frac{1}{2}$, $\Lambda_{iu} = 0$ for all u ∈ ⌊n⌋, u≠j,k, $$b_i = \Phi^{-1}(\widehat{Agg_{OOD}}(h, h')) - \hat{a} * \left( \frac{\Phi^{-1}(\widehat{Acc_{ID}}(h)) + \Phi^{-1}(\widehat{Acc_{ID}}(h'))}{2} - \Phi^{-1}\widehat{Agg_{ID}}(h, h') \right).$$

Sixth, $w^* = \arg\min_{w \in R^n} \|Aw - b\|^2$ is determined. Seventh, an estimated OOD accuracy for model $h_i$ is represented as $\Phi^{-1}(w^*_i)$, for all i ∈ [n].

Figure 4A:
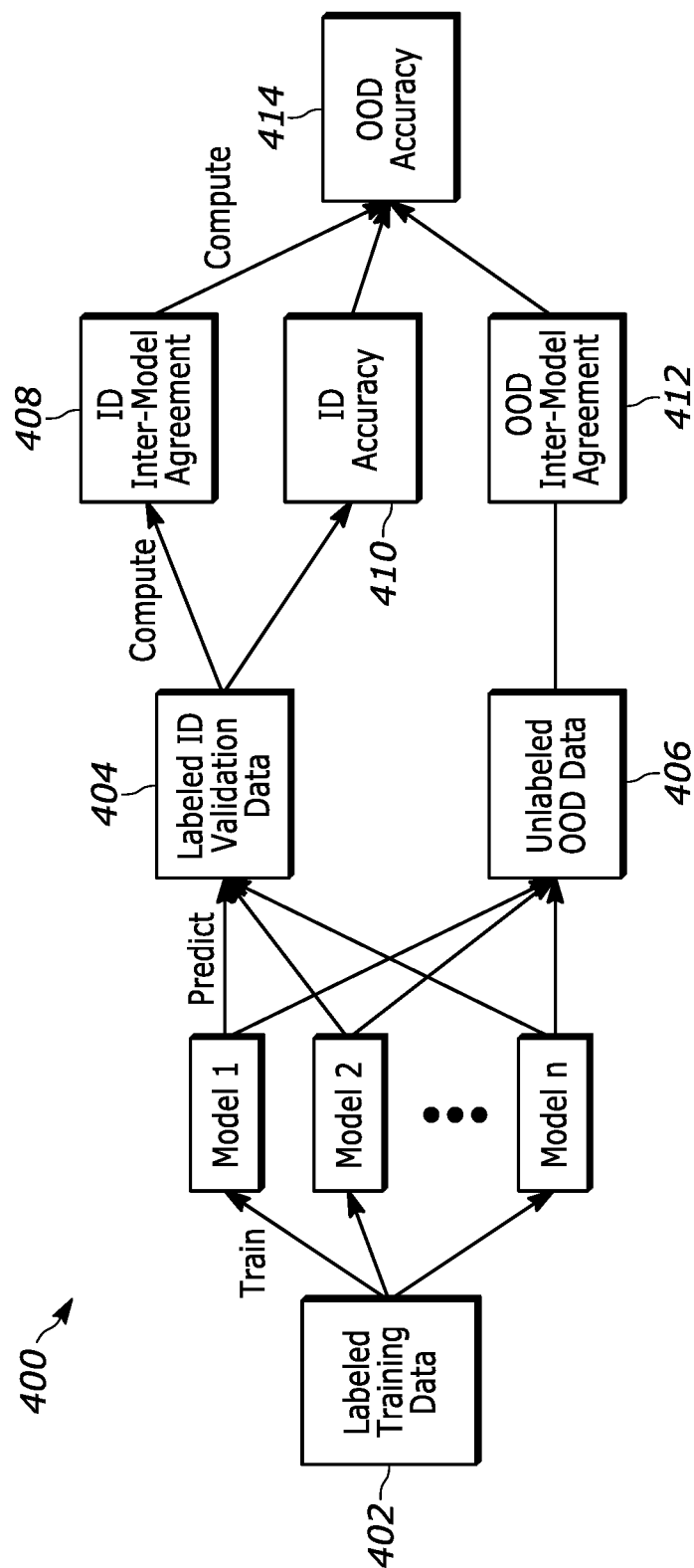
FIG. 4A shows a schematic diagram of a process for estimating a machine learning model's out-of-distribution accuracy without requiring access to any out-of-distribution labeled data, according to an embodiment.

Given the above, FIG. 4A illustrates a schematic diagram of a process 400 for estimating a machine learning model's OOD accuracy without requiring access to any out-of-distribution labeled data, according to an embodiment. At 402, labeled training data is provided as input to train a plurality of machine learning models. The models are executed to predict labeled in-distribution validation data at 404. Unlabeled out-of-distribution data is provided at 406. At 408, the in-distribution agreement $\widehat{Agg_{ID}}(h_i, h_j)$ between at least a pair of models is determined, for example using equation (2) explained above. This determination is made without the unlabeled OOD data provided at 406. At 410, the in-distribution accuracy $\widehat{Acc_{ID}}(h)$ of a select model can be determined, for example using equation (1) explained above. Again, this determination can be made without the unlabeled OOD data provided at 406. At 412, the out-of-distribution agreement $\widehat{Agg_{OOD}}(h, h')$ between the pair of models $h_i$, $h_j$ are determined based on the unlabeled OOD data provided at 406. Again, this can be determined based on equation (2) above. Then, at 414, the out-of-distribution accuracy $Acc_{OOD}(h)$ can be determined based on the in-distribution agreement $\widehat{Agg_{ID}}(h_i, h_j)$, the in-distribution accuracy $\widehat{Acc_{ID}}(h)$, and the out-of-distribution agreement between the models $Agg_{OOD}(h_i, h_j)$.

Figure 4B:
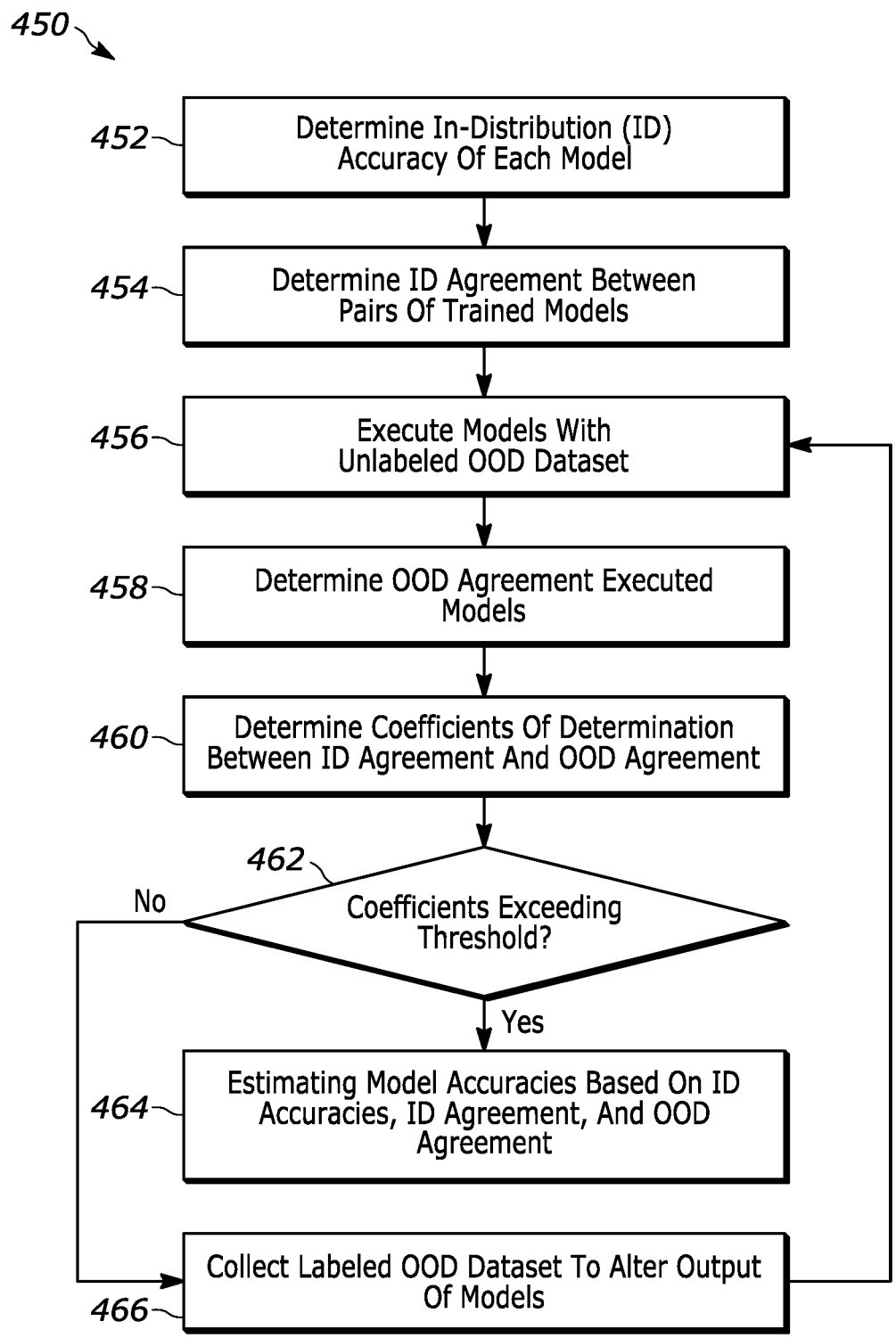
FIG. 4B shows a flowchart of an algorithm for estimating a machine learning model's out-of-distribution accuracy without requiring access to any out-of-distribution labeled data, according to an embodiment.

FIG. 4B shows a flowchart of a method 450 for estimating a machine learning model's OOD accuracy without requiring access to any out-of-distribution labeled data, according to an embodiment. At 452, the ID accuracy $\widehat{Acc_{ID}}(h)$ of each model of the set is determined, for example using equation (1) above. The ID accuracy is the measurement of the accuracy of the model's ability to accurately process in-distribution data. At 454, the ID agreement $\widehat{Agg_{ID}}(h_i, h_j)$ between a select model and a plurality of other models is determined. This can be done utilizing equation (2) above. The ID agreement represents the agreement between a select model and the remainder of models when executing ID data.

At 456, the models are provided with OOD data. The select model and the other models are executed with the OOD dataset. This allows a determination at 458 of the OOD agreement $Ag\overline{g_{OOD}}(h,h')$ between the select model and the remainder of models. In other words, a determination is made as to the agreement between the output of the models when executing OOD data. This can be performed using equation (2) as described above.

At 460, a coefficient of determination $R^2$ is determined, representing a comparison between the ID agreement and the OOD agreement. The coefficient of determination $R^2$ can be in the range of 0 to 1, where 1 represents a 100 percent agreement between the ID agreement and the OOD agreement. This is one method of comparing the ID agreement and the OOD agreement.

At 462, it is determined whether the coefficient of determination $R^2$ exceeds a threshold. In other words, are the models' ID agreement and OOD agreements sufficiently similar? In some embodiments, the threshold may be set such that the coefficient of determination $R^2$ is 0.95 or greater. Other thresholds may be set, and may or may not be on the basis of a coefficient of determination $R^2$.

If the comparison yields a sufficient relationship between the ID agreement and the OOD agreement (e.g., if the coefficient of determination $R^2$ is at or above the corresponding threshold), then at 464 the select model's accuracy can be estimated based on the determined ID accuracies, ID agreement, and OOD agreement. In other words, the OOD accuracy of the select model is estimated. This can be performed according to the two embodiments of estimating the OOD accuracy explained above, for example. If the model's OOD accuracy is above a threshold, the model can be pushed to production, or at least advanced further along toward production. Ultimately, when in production, the model can be executed to control a control system such as any of the embodiments described with reference to FIGS. 6-11.

However, at 462 if the comparison yields an insufficient relationship between the ID agreement and the OOD agreement (e.g., if the coefficient of determination $R^2$ is below the corresponding threshold), then the model may not be pushed toward production. Instead, other options are available. For example, at 466 the system can collect labeled OOD data for execution of the models in order to alter the output of the models. The system can return to 456 where the models are executed with labeled (instead of or in addition to the unlabeled) OOD data. The OOD accuracy of the model can then be determined based on this labeled OOD data.

As described above, the machine learning models disclosed herein can be provided with OOD data in order to determine the accuracy of the models when subjected to OOD data. If the machine learning model sufficiently processes OOD data, the model can be pushed closer toward production (or placed into production). The machine learning model, once trained and determined to sufficiently process OOD data, can then actuate an actuator of a computerized control system. Several examples of computerized control systems are shown in FIGS. 6-11. In these embodiments, the machine learning models can be implemented in production for use as illustrated. Structure used for training and using the machine learning models for these applications (and other applications) are exemplified in FIG. 5.

Figure 5:
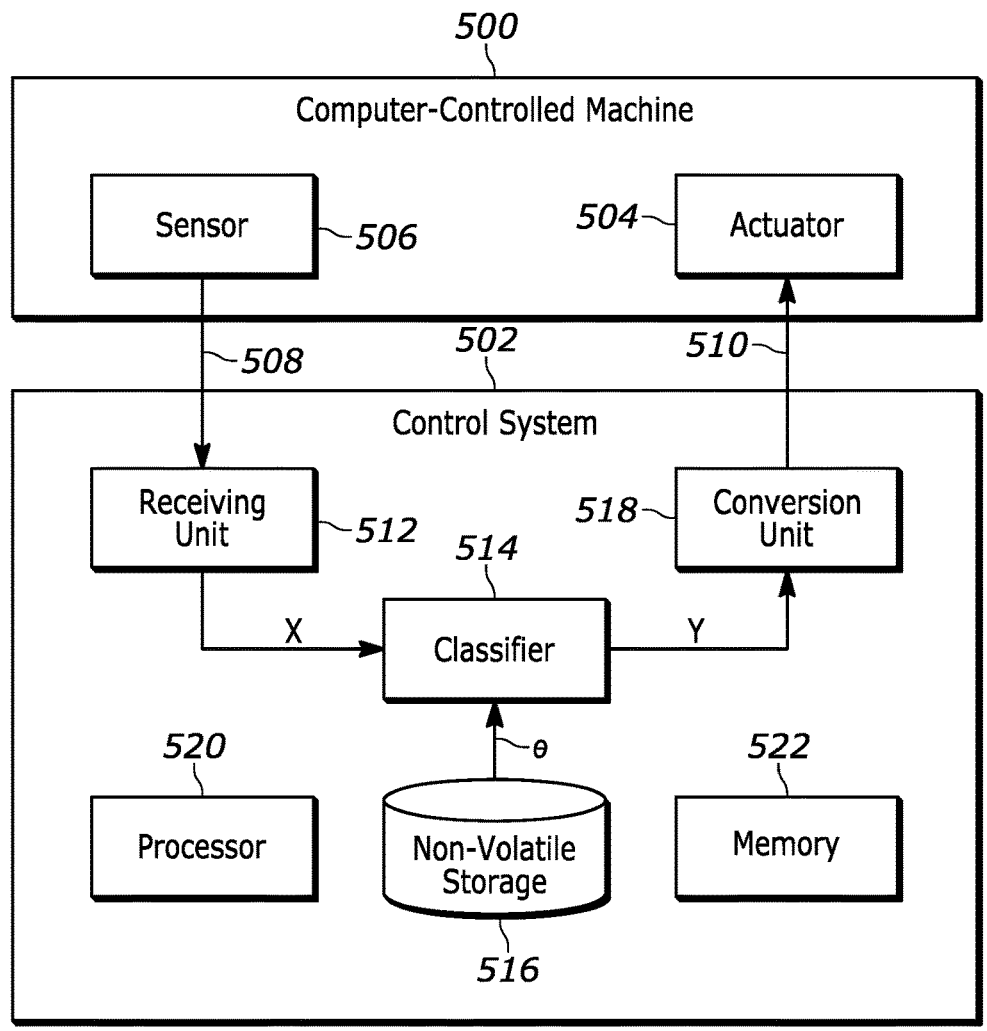
FIG. 5 depicts a schematic diagram of an interaction between a computer-controlled machine and a control system, according to an embodiment.

FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors, as described above with reference to FIGS. 1-2. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine learning (ML) algorithm, such as a neural network described above. Classifier 514 is configured to be parametrized by parameters, such as those described above (e.g., parameter 0). Parameters 0 may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine learning algorithms, such as those described above with regard to pre-trained classifier 306) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
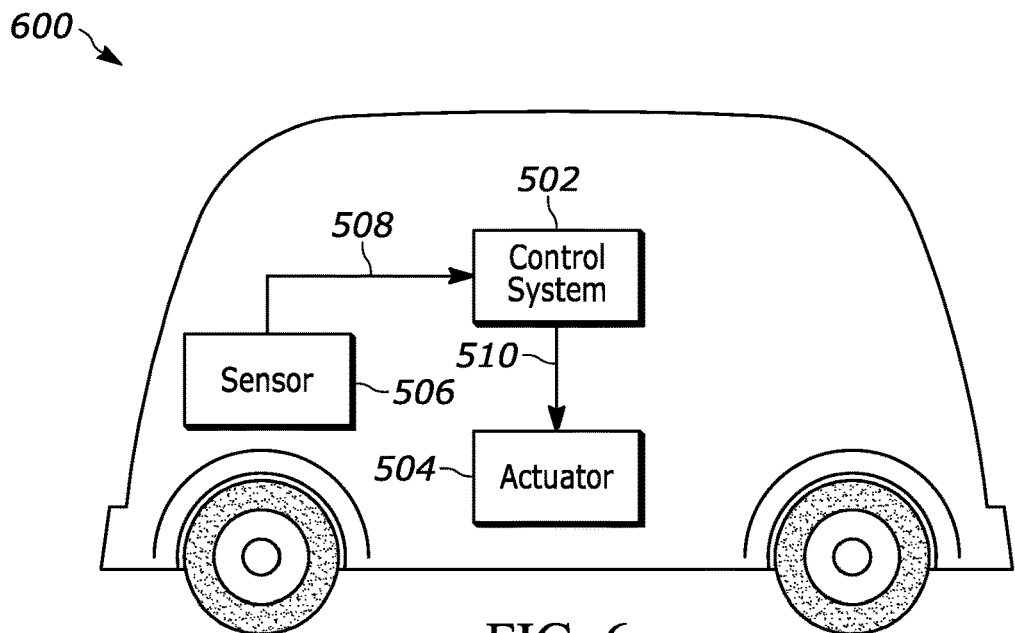
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIGS. 6-11 illustrate various embodiments of not only training a machine learning system, but also implementing a trained machine learning model once confirmed to have adequate ability to process OOD data. FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
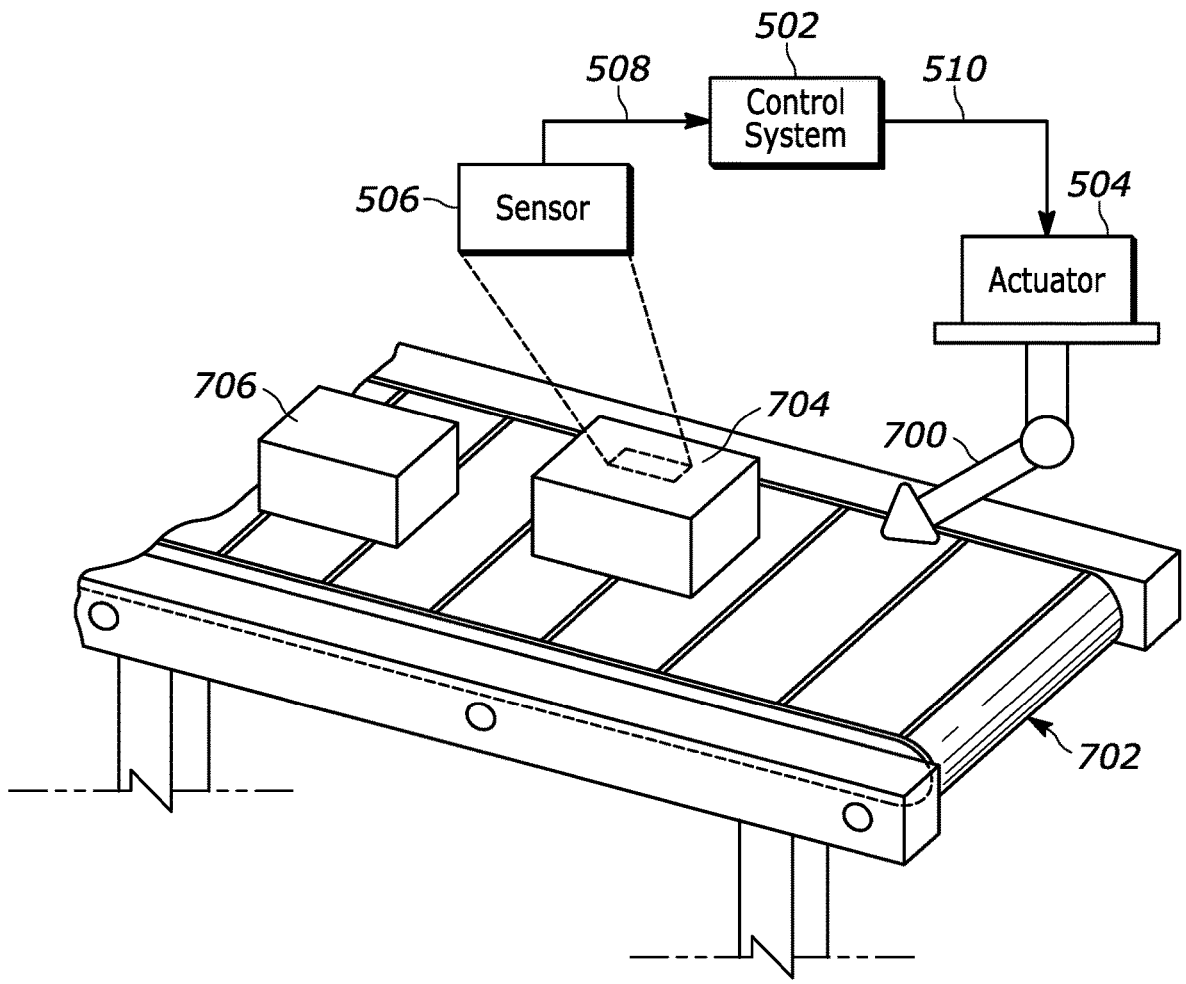
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor (such as those described above) configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704, or for binning the manufactured product 704 (e.g., discard, sorting, marking, trimming, or repair) if the manufactured product 704 has a detected defect. The actuator 504 may be configured to control functions of system 700 (e.g., manufacturing machine) on subsequent manufactured product 706 of system 700 (e.g., manufacturing machine) depending on the determined state of manufactured product 704.

Figure 8:
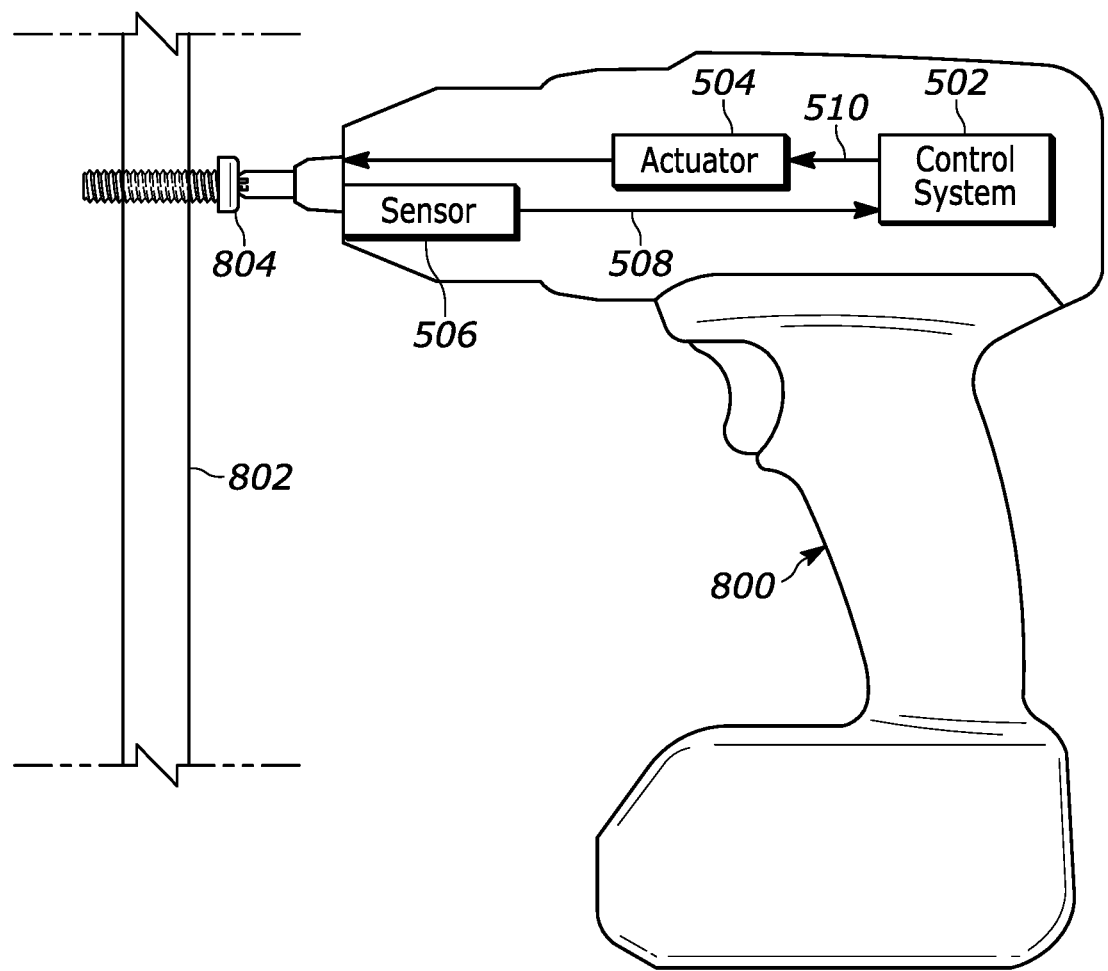
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
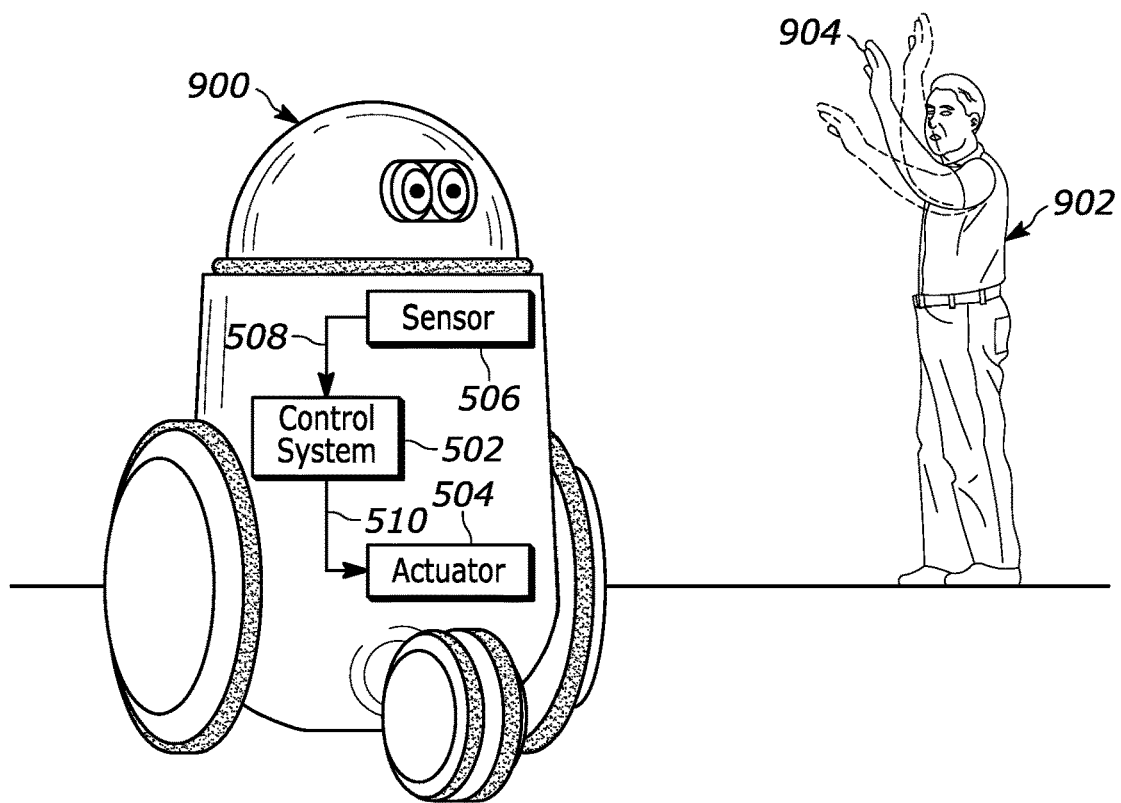
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
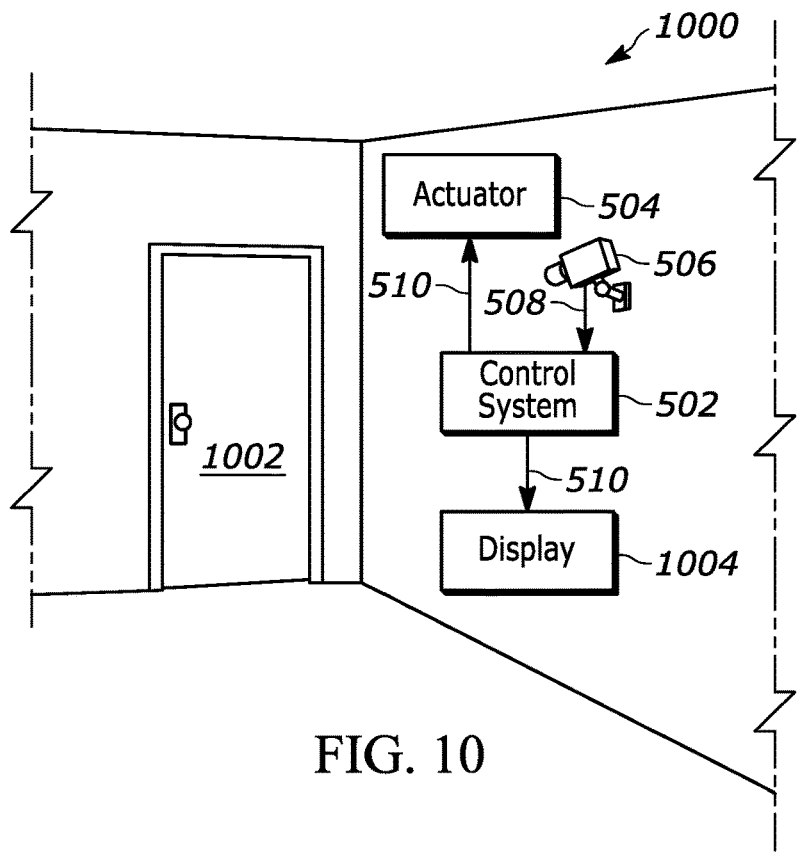
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
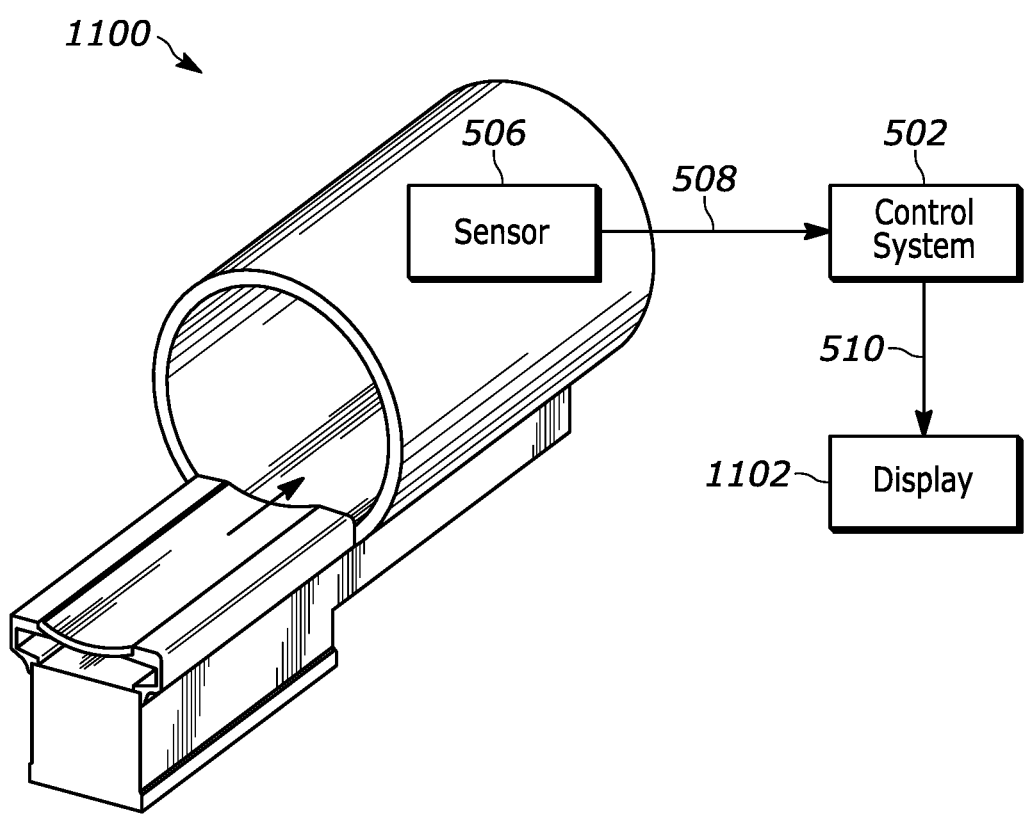
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

Embodiments described above allow for a system that can estimate the accuracy or performance of a machine learning model by looking at unlabeled, OOD data. Labeling the data, or obtaining labeled data, can be expensive. Unlabeled, raw OOD data can be used to estimate the model's accuracy according to the teachings above. In an example, an autonomous vehicle may have one or more machine learning models trained on certain in-distribution data regarding road signs from a certain region of the country (e.g., Pittsburgh). The accuracy of the model when subjected to OOD data should be estimated in order to assure the machine learning model can properly be executed in another region of the country (e.g., Arizona) where images captured by the vehicle may contain road signs with completely different styles, shading, text, orientation, etc. According to the teachings herein, the inventors have discovered that an agreement in output by models correlates with the similarities in the model's accuracies themselves. In other words, there is a correlation between a high accuracy of models and a high agreement between their outputs. Also, provided the agreement in outputs by models on ID data correlates with the agreement in outputs by models on OOD data, the better a model performs with ID data, the better it will perform with OOD data. So, given this understanding, systems are provided herein that can estimate the OOD accuracy of a model based on the OOD agreements between a set (of pair) of models. The slope (given y=ax+b) of the agreement can yield an estimation of the OOD accuracy. One method of estimating the OOD accuracy includes using equation (4) to estimate a and b using model agreement, but instead of directly plugging in a and b into equation (3), a set of linear equations are solved. In an embodiment, instead of solving OOD accuracy of each model, the OOD accuracies of all models can be solved together—the average of all OOD accuracies of all n models.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method of estimating an accuracy of a neural network on out-of-distribution data, the method comprising:
    via one or more processors, determining in-distribution accuracies of a plurality of machine learning models trained with in-distribution data, wherein the plurality of machine learning models includes a first machine learning model;
    via the one or more processors, determining an in-distribution agreement between (i) an output of the first machine learning model executed with an in-distribution dataset and (ii) outputs of a remainder of the plurality of machine learning models executed with the in-distribution dataset;
    via the one or more processors, executing the plurality of machine learning models with an unlabeled out-of-distribution dataset;
    via the one or more processors, determining an out-of-distribution agreement between (i) an output of the first machine learning model executed with the unlabeled out-of-distribution dataset and (ii) outputs of the remainder of the machine learning models executed with the unlabeled out-of-distribution dataset;
    via the one or more processors, comparing the in-distribution agreement and the out-of-distribution agreement;
    via the one or more processors, and based on a result of the comparison being within a threshold, estimating an accuracy of the first machine learning model on the unlabeled out-of-distribution dataset based on (i) the in-distribution accuracies, (ii) the in-distribution agreement, and (iii) the out-of-distribution agreement; and
    via the one or more processors, and based on the estimated accuracy exceeding an accuracy threshold, operating a computerized control system with the first machine learning model.

2. The computer-implemented method of claim 1, further comprising:
    via the one or more processors, and based on the result of the comparison being outside of the threshold, collecting a labeled out-of-distribution dataset to alter the output of the plurality of machine learning models.

3. The computer-implemented method of claim 1, further comprising:
    based on the estimated accuracy failing to exceed the accuracy threshold, altering the first machine learning model to produce another out-of-distribution accuracy that that exceeds the accuracy threshold.

4. The computer-implemented method of claim 1, wherein the computerized control system is part of an autonomous vehicle or semi-autonomous vehicle, and wherein the operating of the computerized control system causes a change in vehicle speed.

5. The computer-implemented method of claim 1, wherein the step of comparing includes plotting first data points of the in-distribution agreement and second data points of the out-of-distribution agreement.

6. The computer-implemented method of claim 5, wherein the step of comparing includes comparing a slope of the first data points relative to the second data points.

7. The computer-implemented method of claim 1, further comprising:
 determining if an accuracy of a neural network subject to a distribution shift can perform the step of estimating based on a comparison between the in-distribution agreement and the out-of-distribution agreement.

8. The computer-implemented method of claim 1, wherein the in-distribution data and out-of-distribution data is image data corresponding to an image captured from an image sensor.

9. A system of estimating an accuracy of a neural network subject to a distribution shift, the system comprising:
 an actuator configured to actuate based on commands from a computerized control system;
 one or more processors; and
 memory including instructions that, when executed by the one or more processors, cause the one or more processors to:
  utilize a plurality of machine learning models trained with in-distribution data, wherein the plurality of machine learning models includes a first machine learning model and a remaining number of machine learning models;
  determine in-distribution accuracies of the plurality of machine learning models by executing the plurality of machine learning models with in-distribution data;
  determine an in-distribution agreement between (i) an output of the first machine learning model executed with the in-distribution data and (ii) outputs of remaining number of machine learning models executed with the in-distribution data;
  execute the plurality of machine learning models with unlabeled out-of-distribution data;
  determine an out-of-distribution agreement between (i) an output of the first machine learning model executed with the unlabeled out-of-distribution data and (ii) outputs of the remaining number of machine learning models executed with the unlabeled out-of-distribution data;
  compare the in-distribution agreement with the out-of-distribution agreement;
  based on the comparison indicating a sufficient similarity between the in-distribution agreement and the out-of-distribution agreement, estimate an out-of-distribution accuracy of the first machine learning models with the unlabeled out-of-distribution dataset based on (i) the in-distribution accuracies, (ii) the in-distribution agreement, and (iii) the out-of-distribution agreement; and
  based on the estimated accuracy exceeding an accuracy threshold, command the computerized control system to actuate the actuator.

10. The system of claim 9, wherein the memory further includes instructions that, when executed by the one or more processors, cause the one or more processors to:
 based on the result of the comparison being outside of the threshold, collect labeled out-of-distribution data to alter the output of the plurality of machine learning models.

11. The system of claim 9, wherein the memory further includes instructions that, when executed by the one or more processors, cause the one or more processors to:
 based on the estimated out-of-distribution accuracy failing to exceed the accuracy threshold, alter the first machine learning model to produce another out-of-distribution accuracy that that exceeds the accuracy threshold.

12. The system of claim 9, wherein the computerized control system is part of an autonomous vehicle or semi-autonomous vehicle, and wherein the actuation of the actuator causes a change in vehicle speed.

13. The system of claim 9, wherein the comparison of the in-distribution agreement with the out-of-distribution agreement includes plotting first data points of the in-distribution agreement and second data points of the out-of-distribution agreement.

14. The method of claim 13, wherein the comparison of the in-distribution agreement with the out-of-distribution agreement includes comparing a slope of the first data points relative to the second data points.

15. The system of claim 9, wherein the memory further includes instructions that, when executed by the one or more processors, cause the one or more processors to:
 determine if an accuracy of a neural network subject to a distribution shift can perform the estimate based on a comparison between the in-distribution agreement and the out-of-distribution agreement.

16. A system of estimating an accuracy of a neural network subject to a distribution shift, the system comprising:
 one or more processors programmed to:
  determine in-distribution accuracies of a plurality of machine learning models by executing on in-distribution data, wherein the plurality of machine learning models includes a first machine learning model and a remainder of machine learning models;
  determine an in-distribution agreement between (i) an output of the first machine learning model executed with the in-distribution data and (ii) outputs of the remainder of machine learning models executed with the in-distribution data;
  execute the plurality of machine learning models with unlabeled out-of-distribution data;
  determine an out-of-distribution agreement between (i) an output of the first machine learning model executed with the unlabeled out-of-distribution data and (ii) outputs of the remainder of machine learning models executed with the unlabeled out-of-distribution data;
  compare the in-distribution agreement with the out-of-distribution agreement; and
  estimate an out-of-distribution accuracy of the first machine learning model with the unlabeled out-of-distribution dataset based on (i) the in-distribution accuracies, (ii) the in-distribution agreement, and (iii) the out-of-distribution agreement.

17. The system of claim 16, further comprising an actuator configured to actuate based on commands from a computerized control system, wherein the one or more processors are programmed to command the computerized control system to actuate the actuator based on the estimated accuracy exceeding an accuracy threshold.

18. The system of claim 17, wherein the computerized control system is part of an autonomous vehicle or semi-autonomous vehicle, and wherein the actuation of the actuator causes a change in vehicle speed.

19. The system of claim 16, wherein the one or more processors is further programmed to:
    based on the estimated out-of-distribution accuracy failing to exceed an accuracy threshold, altering the first machine learning model to produce another out-of-distribution accuracy that that exceeds the accuracy threshold.

20. The system of claim 16, wherein the one or more processors is further programmed to:
    based on the estimated out-of-distribution accuracy exceeding an accuracy threshold, approving the first machine learning model for production.

\* \* \* \* \*